United States Patent
Rolka

(10) Patent No.: US 9,475,360 B2
(45) Date of Patent: Oct. 25, 2016

(54) VEHICLE SAFETY ARRANGEMENT, VEHICLE AND A METHOD FOR INCREASING VEHICLE SAFETY

(71) Applicant: VOLVO CAR CORPORATION, Gothenburg (SE)

(72) Inventor: Lucas Rolka, Gothenburg (SE)

(73) Assignee: VOLVO CAR CORPORATION (SE)

(*) Notice: Subject to any disclaimer, the term of this patent is extended or adjusted under 35 U.S.C. 154(b) by 0 days.

(21) Appl. No.: 14/967,858

(22) Filed: Dec. 14, 2015

(65) Prior Publication Data
US 2016/0176265 A1 Jun. 23, 2016

(30) Foreign Application Priority Data
Dec. 19, 2014 (EP) .................................. 14199225

(51) Int. Cl.
| | | |
|---|---|---|
| *B60H 1/00* | (2006.01) | |
| *B60L 11/18* | (2006.01) | |
| *B60N 2/00* | (2006.01) | |
| *B60R 25/102* | (2013.01) | |
| *B60W 40/08* | (2012.01) | |
| *B60J 5/00* | (2006.01) | |
| *B60W 50/00* | (2006.01) | |
| *B60W 50/04* | (2006.01) | |
| *B60W 40/00* | (2006.01) | |

(52) U.S. Cl.
CPC ............. *B60H 1/00742* (2013.01); *B60J 5/00* (2013.01); *B60L 11/1861* (2013.01); *B60N 2/002* (2013.01); *B60R 25/102* (2013.01); *B60W 40/00* (2013.01); *B60W 40/08* (2013.01); *B60W 50/00* (2013.01); *B60W 50/0098* (2013.01); *B60W 50/04* (2013.01); *B60W 2040/0818* (2013.01); *B60W 2050/046* (2013.01); *B60W 2550/40* (2013.01); *B60W 2560/02* (2013.01); *B60W 2750/40* (2013.01)

(58) Field of Classification Search
None
See application file for complete search history.

(56) References Cited

FOREIGN PATENT DOCUMENTS

| | | |
|---|---|---|
| DE | 102012019056 A1 | 3/2013 |
| JP | 2012153232 A | 8/2012 |
| JP | 2014065361 A | 4/2014 |
| WO | 2006127281 A1 | 11/2006 |
| WO | 2009043650 A1 | 4/2009 |

OTHER PUBLICATIONS

Extended European Search Report Dated Jul. 28, 2015, Application No. 14199225.5-1752, Applicant Volvo Car corporation, 4 Pages.

*Primary Examiner* — Thomas Tarcza
*Assistant Examiner* — Garrett Evans
(74) *Attorney, Agent, or Firm* — Brooks Kushman P.C.

(57) ABSTRACT

A vehicle, a method and a vehicle safety arrangement are provided. The vehicle safety arrangement comprises a vehicle propellant amount determination unit, a vehicle passenger compartment, a vehicle motor, a communication unit and a vehicle occupant detection unit, arranged to detect at least one of a presence of at least one vehicle occupant and a vehicle occupant condition. The arrangement is arranged to initiate a communication indicative of the amount of propellant stored in the vehicle to an external recipient if the presence of at least one vehicle occupant is detected within the vehicle passenger compartment and the vehicle motor has been inoperative for a threshold amount of time, or a vehicle occupant condition is detected, which matches at least one predefined vehicle occupant condition.

13 Claims, 2 Drawing Sheets

VEHICLE SAFETY ARRANGEMENT, VEHICLE AND A METHOD FOR INCREASING VEHICLE SAFETY

CROSS-REFERENCE TO RELATED APPLICATIONS

This application claims foreign priority benefits under 35 U.S.C. §119(a)-(d) to European patent application number EP 14199225.5, filed Dec. 19, 2014, which is incorporated by reference in its entirety.

TECHNICAL FIELD

Embodiments herein relate to a vehicle safety arrangement. Embodiments herein further relate to a vehicle comprising a vehicle safety arrangement and to a method for increasing vehicle safety.

BACKGROUND

Many vehicles today are equipped with arrangements which aim to increase safety for vehicle occupants. Examples of such arrangements are high strength vehicle beams and deformation zones for controlled force-distribution during a collision and safety belts and airbags which are arranged to constrain vehicle occupants.

Some vehicles today are equipped with predictive safety systems or adaptive cruise control systems. Such systems will e.g., monitor vehicle surroundings and determine a position of another vehicle near a vehicle equipped with such a system. Such systems will e.g., calculate whether there will be a collision between the vehicle and the other vehicle, and in such case warn a driver of the vehicle. Some safety systems will calculate a time until a possible collision between a host vehicle and another vehicle. If a collision is expected, emergency braking of the host vehicle may be activated for preventing or at least mitigating the collision.

Other arrangements may be capable of detecting a potentially dangerous situation and alert a driver. For example, safety arrangements can detect if a driver seems to be tired during driving, and if so, activate an audio alert. In JP2014065361A a vehicle safety system is discussed that comprises sensors for detecting an infant in the vehicle and a temperature sensor. If the temperature becomes too high when an infant is present in the vehicle the system communicates this to an emergency center.

The arrangements and systems of today may be useful in some scenarios. However, improved safety arrangements for vehicles and/or alternative safety arrangements for vehicles are still desirable.

SUMMARY

Embodiments herein aim to provide a vehicle safety arrangement eliminating or at least reducing the problems and/or drawbacks associated with prior art arrangements for vehicle safety.

According to an embodiment, this is provided by a vehicle safety arrangement for a vehicle comprising a vehicle propellant amount determination unit, arranged to determine an amount of propellant stored in the vehicle, a vehicle passenger compartment, a vehicle motor, a communication unit and a vehicle occupant detection unit, arranged to detect at least one of:
presence of at least one vehicle occupant, and
a vehicle occupant condition,
wherein the arrangement is arranged to initiate a communication indicative of the amount of propellant stored in the vehicle to an external recipient if
the presence of at least one vehicle occupant is detected within the vehicle passenger compartment and the vehicle motor has been inoperative for a threshold amount of time, or
a vehicle occupant condition is detected, which matches at least one predefined vehicle occupant condition.

Since the vehicle occupant detection unit is arranged to detect at least one of a presence of at least one vehicle occupant and a vehicle occupant condition, and further arranged to initiate a communication indicative of the amount of propellant stored in the vehicle to an external recipient if the presence of at least one vehicle occupant or a vehicle occupant condition is detected, safety of the at least one vehicle occupant is increased. If the presence of a vehicle occupant is detected when the vehicle motor has been inoperative for a while, this can indicate that e.g., a child is left behind or forgotten in the vehicle. The vehicle system then sends information to the vehicle owner, an emergency center or to any other external recipient. The information concerns, among other things such as information regarding the situation for the child, the amount of propellant stored in the vehicle. Hereby e.g., the owner of the vehicle can base decisions on the received information, for example if it is urgent or not urgent to return to the vehicle. If there is a large amount of propellant stored in the vehicle the vehicle motor can be automatically activated such that e.g., a ventilation system can be turned on. With no propellant left, or with only a small amount of propellant left, activation of the ventilation may be impossible. In such case the vehicle owner will have to return to the vehicle sooner than if the amount of propellant remaining had been larger. If the information is sent to an emergency center, the emergency center is capable to prioritize whether to send an ambulance or the like to the vehicle immediately or possibly later. Also other types of information can be sent to the external recipient, such as information on vehicle position, number of occupants and/or passenger compartment temperature.

According to some embodiments the arrangement is arranged to initiate a communication indicative of the amount of propellant stored in the vehicle only if the amount is below a predefined threshold amount. Hereby information on the amount of propellant is communicated to the external recipient only if it is considered necessary, for example if the amount of propellant is insufficient to keep a ventilation system active for a threshold amount of time.

According to some embodiments the arrangement is arranged to initiate a communication indicative of the amount of propellant stored in the vehicle if the presence of at least one vehicle occupant is detected within the vehicle passenger compartment when the vehicle motor has been inoperative for a threshold amount of time and the temperature within the vehicle passenger compartment, provided by a vehicle temperature sensor, is above a predefined threshold temperature.

Since the arrangement is arranged to initiate a communication indicative of the amount of propellant if the presence of at least one vehicle occupant is detected and the temperature within the vehicle passenger compartment is above a predefined threshold temperature information on the amount of propellant is communicated to the external recipient only if it is considered necessary. For example if the amount of propellant is insufficient to keep a ventilation system active for a threshold amount of time when the temperature within the vehicle exceeds the predefined threshold temperature.

According to some embodiments the arrangement comprises a vehicle occupant recognition arrangement which is capable to recognize different kind of vehicle occupants, and where the arrangement is arranged to initiate a communication indicative of the amount of propellant stored in the vehicle if the presence of at least one vehicle occupant is detected within the vehicle passenger compartment, the occupant being at least one of an infant, a child and an animal.

Since the arrangement is arranged to initiate a communication indicative of the amount of propellant stored in the vehicle if the presence of at least one infant, a child and an animal is detected within the vehicle passenger compartment, safety is enhanced for passengers who may have difficulties to exit the vehicle passenger compartment by themselves. In some embodiments the vehicle occupant recognition arrangement is also capable of recognizing elderly persons and/or disabled persons.

According to some embodiments the arrangement is connected to a vehicle passenger compartment ventilating system and further arranged to initiate an activation command to the vehicle passenger compartment ventilating system if the presence of at least one vehicle occupant is detected within the vehicle passenger compartment and the vehicle motor has been inoperative for a threshold amount of time. Hereby the temperature and/or the air quality within the passenger compartment can be controlled.

According to some embodiments the arrangement comprises a ventilation system status determination unit and in that the arrangement is arranged to initiate a communication indicative of the amount of propellant stored in the vehicle only if the vehicle passenger compartment ventilating system status is inoperative. Hereby the temperature and/or the air quality within the passenger compartment can be controlled and unnecessary communications are avoided.

According to some embodiments the arrangement is connected to a vehicle door control system and further arranged to initiate an activation command to open a vehicle door to the vehicle door control system if the presence of at least one vehicle occupant is detected within the vehicle passenger compartment and the vehicle motor has been inoperative for a threshold amount of time.

Since the arrangement is arranged to initiate an activation command to the vehicle door control system to open a vehicle door if the presence of at least one vehicle occupant is detected within the vehicle passenger compartment fresh ambient air can enter the vehicle passenger compartment. Hereby the temperature within the passenger compartment can be decreased.

According to some embodiments the vehicle propellant amount determination unit is arranged to determine a fuel level within a vehicle fuel tank.

Since the vehicle propellant amount determination unit is arranged to determine a fuel level within a vehicle fuel tank, the arrangement is fit for vehicles with a fuel tank, e.g., for gasoline or diesel. The arrangement may be arranged to initiate a communication indicative of the amount of propellant stored in the vehicle to an external recipient only if the fuel level is below a predefined threshold level.

According to some embodiments the vehicle propellant amount determination unit is arranged to determine a state of charge of a vehicle propellant storage unit.

Since the vehicle propellant amount determination unit is arranged to determine a state of charge of a vehicle propellant storage unit the arrangement is fit for vehicles with fuel cells and/or one or more batteries as source of power.

According to some embodiments the arrangement is connected to a vehicle velocity determination unit, arranged to determine a vehicle velocity and where the communication unit is arranged to initiate a communication to an external recipient indicative of the amount of propellant stored in the vehicle if it is determined that the vehicle is driven with a velocity exceeding a threshold velocity and a vehicle occupant condition is detected, which matches at least one predefined vehicle occupant condition, the predefined vehicle occupant condition being at least one of: drowsiness, a shifting gaze, decreased steering wheel grip, unsteady steering wheel handling, an increased heart rate. Hereby the external recipient is informed, among other things, of the amount of propellant in the vehicle if the vehicle occupant's ability to drive the vehicle is decreased, e.g., due to sickness or sleepiness.

According to some embodiments the communication unit further is arranged to, when at least one of the predefined vehicle occupant conditions is detected, initiate a command to perform a controlled stop of the vehicle to a vehicle drive system which is configured to stop the vehicle in a controlled manner in response to the command.

Since the communication unit further is arranged to initiate a command to perform a controlled stop of the vehicle to a vehicle drive system which is configured to stop the vehicle in a controlled manner in response to the command when at least one of the above mentioned predefined vehicle occupant conditions is detected, safety is increased and possible collisions due to the predefined condition(s) are avoided.

Thus, hereby is provided a vehicle safety arrangement, eliminating or at least reducing the problems and/or drawbacks associated with prior art solutions.

Embodiments herein also aim to provide a vehicle comprising a vehicle safety arrangement without at least some of the problems or drawbacks described above.

According to some embodiments, this is provided by a vehicle comprising a vehicle safety arrangement according to embodiments disclosed herein. Since the vehicle comprises a vehicle safety arrangement according to embodiments disclosed herein safety is improved.

Embodiments herein also aim to provide a method for increasing safety in a vehicle without at least some of the problems or drawbacks described above.

According to some embodiments, this is provided by method for increasing safety in a vehicle comprising a vehicle propellant amount determination unit, arranged to determine an amount of propellant stored in the vehicle, a vehicle passenger compartment, a vehicle motor, a communication unit and a vehicle occupant detection unit, arranged to detect at least one of: presence of at least one vehicle occupant and a vehicle occupant condition, wherein the method comprises;

detecting the presence of at least one vehicle occupant within the vehicle passenger compartment and detecting if the vehicle motor has been inoperative for a threshold amount of time, or detecting a vehicle occupant condition, which matches at least one predefined vehicle occupant condition, and if either is detected initiating a communication indicative of the amount of propellant stored in the vehicle to an external recipient.

Since the method comprises: detecting the presence of at least one vehicle occupant if the vehicle motor has been inoperative for a threshold amount of time or detecting a vehicle occupant condition which matches at least one predefined vehicle occupant condition, and if either is detected, initiating a communication indicative of the amount of propellant stored in the vehicle to an external recipient, safety is enhanced.

BRIEF DESCRIPTION OF THE DRAWINGS

The various aspects of embodiments herein, including particular features and advantages, will be readily understood from the following detailed description and the attached drawings, in which.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings. Well-known functions or constructions will not necessarily be described in detail for brevity and/or clarity.

Figure 1:
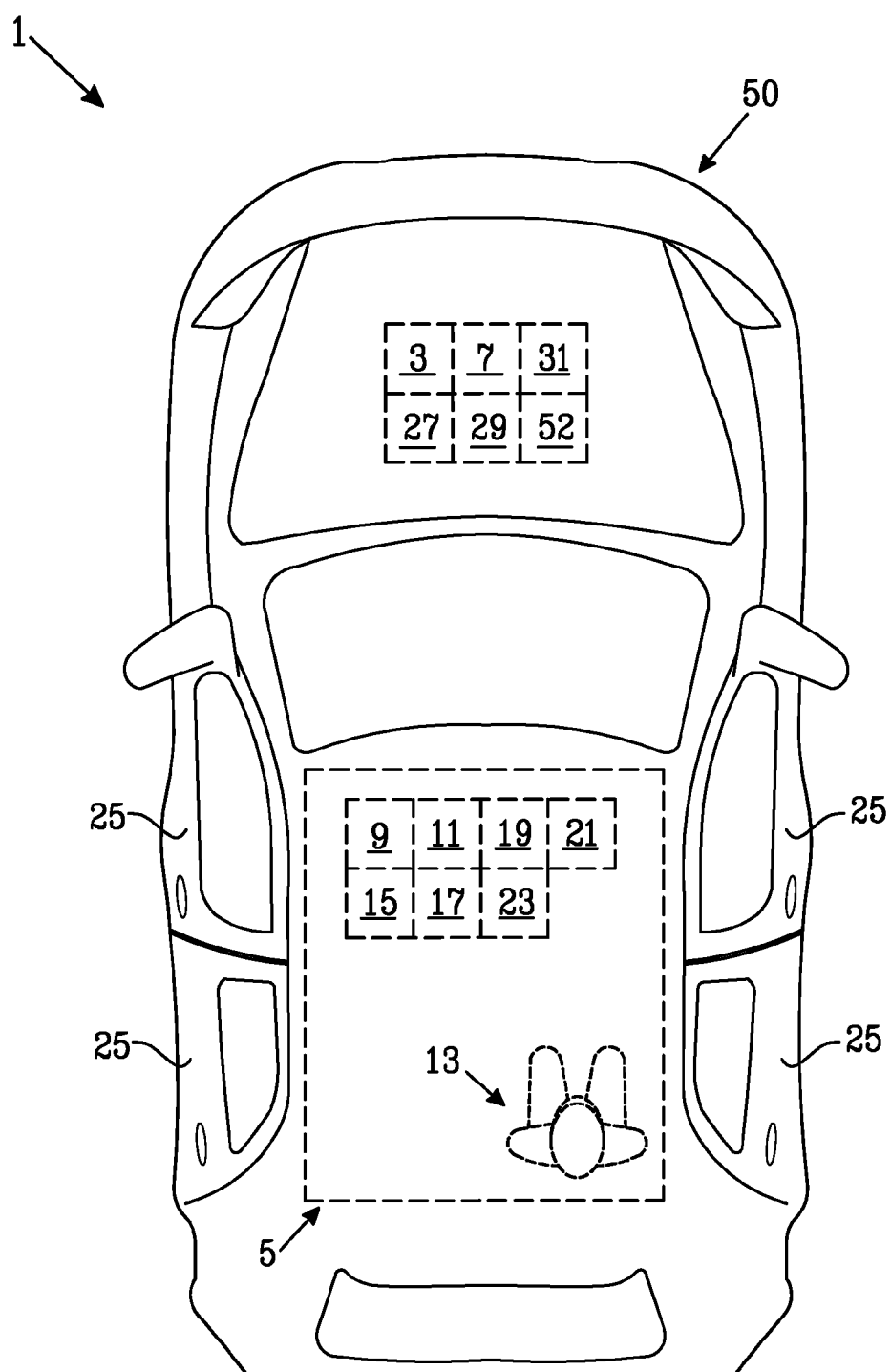
FIG. 1 illustrates a vehicle and a vehicle safety arrangement according to some embodiments.

FIG. 1 illustrates a vehicle safety arrangement 1 for a vehicle 50. The vehicle 50 may be a car, a bus, a truck or any other vehicle comprising a vehicle passenger compartment 5.

The vehicle 50 further comprises a vehicle propellant amount determination unit 3. The vehicle propellant amount determination unit 3 can be a fuel gauge which is arranged to determine a fuel level within a vehicle fuel tank 27 of the vehicle 50. The fuel gauge may include a sensing unit and an indicator which indicates a status of the sensing unit. The sensing unit may for example comprise a float connected to a potentiometer. Alternatively or in addition a magneto resistance type fuel level sensor or any other suitable sensor can be used.

The vehicle propellant amount determination unit 3 can also be any kind of electric charge detecting device which is arranged to determine a state of charge of a vehicle propellant storage unit 29 such as a vehicle battery. In some embodiments the vehicle propellant amount determination unit 3 is arranged to detect a hydrogen level and/or an oxygen level in a vehicle equipped with fuel cells.

The vehicle 50 further comprises a vehicle motor 7, such as an internal combustion engine, one or more electrical motors, a hybrid motor or any other type of motor which is arranged to provide power such that the vehicle 50 may be driven.

The vehicle 50 comprises a communication unit 9. The communication unit 9 can comprise a receiver for receiving signals from at least one external source and/or recipient. The communication unit 9 also comprises a transmitter which can convert any type of information associated with the vehicle 50 into a signal, such as an electrical signal and/or a signal carried by electromagnetic waves. Hereby host vehicle 50 information can be sent to one or more external recipients 60 and possibly also distributed to other vehicles and/or infrastructure such as remote servers/the cloud, databases, and/or roadside units.

Any suitable protocol can be used for the communication between the host vehicle 50 and external recipients 60, e.g., radio signals, such as according to either of standards, such as the GSM, 3 G, LTE and/or WiFi standards, and/or satellite communication signals.

An external recipient 60 can for example be the owner of the vehicle 50, an emergency center or the like.

The vehicle 50 comprises a vehicle occupant detection unit 11. The vehicle occupant detection unit 11 is arranged to detect at least one of presence of at least one vehicle occupant 13 and a vehicle occupant condition. In some embodiments the vehicle occupant detection unit 11 comprises or is connected to a vehicle occupant recognition arrangement 17.

The vehicle occupant detection unit 11 and/or the vehicle occupant recognition arrangement 17 can for example be a camera, which is arranged to monitor the passenger compartment 5 of the vehicle 50. The camera can be equipped with, or connected to, one or more processing units with associated logic, such as logic for detecting and/or recognizing occupants 13 within the vehicle passenger compartment 5. The processing units with associated logic may be arranged to detect and/or recognize different faces, eyes, postures, sizes and other identifiable properties of vehicle occupants 13. Alternatively or in addition, the vehicle occupant detection unit 11 and/or the vehicle occupant recognition arrangement 17 can be a heart rate detection sensor, capable to detect heart beats of vehicle occupants 13. In some embodiments breathing is detected and/or recognized. In some other embodiments the vehicle occupant detection unit 11 and/or the vehicle occupant recognition arrangement 17 can be arranged to detect and/or recognize personal devices of vehicle occupants 13. Such personal devices of vehicle occupants 13 can send a signal indicative of the owner's identification to the vehicle occupant detection unit 11 and/or the vehicle occupant recognition arrangement 17.

In some embodiments the vehicle occupant recognition arrangement 17 is arranged to recognize and/or to categorize different vehicle occupants 13 or different classes or categories of vehicle occupants 13. A class of occupants can be infants. The vehicle occupant recognition arrangement 17 can then for example recognize the occupant to be an infant due to its size, its position, its sound, if a cradle is coupled to a vehicle seat or similar.

A class of occupants can be children. The vehicle occupant recognition arrangement 17 can then for example recognize the occupant to be a child due to its size, its sound, if a child seat is coupled to a vehicle seat or similar.

A class of occupants can be elderly persons. The vehicle occupant recognition arrangement 17 can then for example recognize the occupant to be an elderly person due to its posture, its weight, recognition of any identification typically indicative of elderly persons such as wrinkles, voices etc.

A class of occupants can be persons with disabilities. The vehicle occupant recognition arrangement 17 can then for example recognize the occupant to be a disabled person by recognition of any identification typically indicative for disabled persons such as posture, disability aiding objects or similar.

A class of occupants can be animals, such as pets. The vehicle occupant recognition arrangement 17 can then for example recognize the occupant to be an animal due to its size, its sound such as breathing or heartbeats, if e.g., a dog or cat cage is present in the vehicle passenger compartment 5 or similar.

In some embodiments the arrangement 1 is arranged to initiate a communication to an external recipient 60, via the communication unit 9, indicative of the amount of propellant stored in the vehicle 50 if the presence of at least one vehicle occupant 13 is detected within the vehicle passenger compartment 5 and the vehicle motor 7 has been inoperative for a threshold amount of time. In some embodiments the arrangement 1 is arranged to initiate a communication to an external recipient 60, via the communication unit 9, indicative of the amount of propellant stored in the vehicle 50 if a vehicle occupant condition is detected, which matches at least one predefined vehicle occupant condition.

As mentioned above, the external recipient 60 can be the owner or the user of the vehicle 50. The external recipient 60 can be an emergency center of any kind. The external recipient 60 can be mobile electronic devices, such as mobile phones, of persons near the vehicle 50. Location based information can be used to identify any number of persons carrying mobile electronic devises near the vehicle 50.

In some embodiment the vehicle 50 comprises one or more temperature sensors 15. Such a temperature sensor or thermometer can, continuously or at certain intervals, detect the temperature prevailing within the vehicle passenger compartment 5. The temperature sensor 15 is connected to the vehicle safety arrangement 1.

In some embodiments the vehicle safety arrangement 1 is connected to a vehicle passenger compartment 5 ventilating system 19. The vehicle safety arrangement 1 can then be arranged to initiate an activation command to the vehicle passenger compartment 5 ventilating system 19 if the presence of at least one vehicle occupant 13 is detected within the vehicle passenger compartment 5 and the vehicle motor 7 has been inoperative for a threshold amount of time.

In some embodiments the vehicle safety arrangement 1 is arranged to initiate an activation command to the vehicle motor 7, such that the vehicle motor 7 is activated in response to the activation command. The motor 7 can then, possibly via an alternator and a vehicle battery, provide the ventilation system 19 with sufficient electricity. The ventilation system 19 can then be controlled by the vehicle safety arrangement 1, to be in an activated state as long as electricity is provided. The motor 7 is capable to provide operating power to the ventilation system, or any other system and/or arrangement described herein, as long as the motor 7 has a sufficient stock of propellant, e.g., in form of gasoline or electricity. The ventilation system 19 can include e.g., a HVAC-system which is arranged to control temperature and/or air quality of air flowing through the ventilation system 19. Such a system may include air conditioning arrangements, air cooling arrangements and/or air heating arrangements.

In some embodiments the vehicle safety arrangement 1 is arranged to initiate a communication indicative of the amount of propellant stored in the vehicle 50 to an external recipient 60 and/or to activate the ventilation system 19 only if the temperature within the vehicle passenger compartment 5 is above a predefined threshold temperature. Such a threshold temperature can for example be in the range of 20-30 degrees Celsius. The ventilation system 19 can then cool the vehicle passenger compartment 5 such that comfort for vehicle occupants 13 within the passenger compartment 5 is increased. Hereby any possible health and/or comfort issues normally associated with high temperatures, i.e., temperatures above the threshold temperature are avoided. Examples of such issues are problem to breath, hyperthermia, fatigue, fainting etc.

In some embodiments the vehicle safety arrangement 1 is arranged to initiate a communication to an external recipient 60 indicative of the amount of propellant stored in the vehicle 50 and/or to activate the ventilation system 19 only if the temperature within the vehicle passenger compartment 5 is below a predefined threshold temperature. Such a threshold temperature can for example be in the range of 0-15 degrees Celsius. The ventilation system 19 can then warm up the vehicle passenger compartment 5 such that comfort for vehicle occupants 13 within the passenger compartment 5 is increased. Hereby any possible health and/or comfort issues normally associated with low temperatures, i.e., temperatures below the threshold temperature are avoided. Examples of such issues are hypothermia, freezing, shivering, decreased body functions etc.

EXAMPLES

It is detected that an infant is left alone in the vehicle 50 on a sunny day and that the temperature within the vehicle passenger compartment 5 rises to 25 degrees Celsius. The vehicle safety arrangement 1 activates the ventilation system 19 in order to cool the passenger compartment 5. When vehicle battery power falls below a threshold charge level the vehicle motor 7, in this case an internal combustion engine, is automatically started in order to generate electricity to replenish the battery, such that the ventilation system 19 can continue to cool the passenger compartment 5. When the fuel level is less than e.g., 50%, 40%, 30%, 20% or 10% information on the situation, together with fuel level information, is sent to the vehicle owner. If the vehicle owner does not respond to the information or does not return to the vehicle 50 within a pre-determined time-period information is sent to an emergency center. Personnel at the emergency center can then e.g., see that the fuel level is 40% where after they can direct a police patrol to the vehicle 50 without urgency. Should, however, information on a fuel level of 5% be sent to the emergency center they may decide to direct a police patrol or an ambulance to the vehicle 50 immediately.

In some embodiments the communication unit 9 of the vehicle safety arrangement 1 is connected to an interior camera of the vehicle 50. Personnel at the emergency center may then, after receiving information on the situation, remotely activate the vehicle interior camera via the communication unit 9. They may then be given access to remotely use the interior camera of the vehicle 50 to confirm the prevailing situation within the vehicle passenger compartment 5.

In some embodiments location based data is used to identify persons near the vehicle 50 carrying mobile phones. Such identification may e.g., be based on GPS-data from the mobile phones and/or information on which telecommunication mast a particular mobile phone is connecting to. Information on the situation in the vehicle passenger compartment 5 can then be sent to persons within a certain distance from the vehicle 50. In some embodiments a horn, a light and/or other warning means of the vehicle 50 is/are activated.

The vehicle 50 in the FIG. 1 embodiment comprises a vehicle door control system 23 which is arranged to control vehicle doors 25 between an open or a closed position, and further arranged to control vehicle windows between an open or a closed position. The vehicle door control system 23 can be e.g., an electrical system, and/or any kind of mechanical system which can be controlled by the vehicle safety arrangement 1. In some embodiments the vehicle safety arrangement 1 is arranged to initiate an activation command to the vehicle door control system 23 to open a vehicle door 25 if the presence of at least one vehicle occupant 13 is detected within the vehicle passenger compartment 5 and the vehicle motor 7 has been inoperative for a threshold amount of time.

In some embodiments the vehicle safety arrangement 1 comprises or is connected to a vehicle velocity determination unit 31. The vehicle velocity determination unit 31 can be e.g., a speedometer that measures and/or displays an instantaneous velocity of the vehicle 50. The communication unit 9 can then be arranged to initiate a communication to an external recipient 60 indicative of the amount of propellant stored in the vehicle 50 if it is determined that the vehicle 50 is driven with a velocity exceeding a threshold velocity and a vehicle occupant condition is detected, which matches at least one predefined vehicle occupant condition. The predefined vehicle occupant condition can be one or more of the following conditions: drowsiness, a shifting gaze, decreased steering wheel grip, unsteady steering wheel handling and an increased heart rate. Such condition or conditions can be detected in any known manner. For example, a camera which monitors the face of an occupant may detect drowsiness or a shifting gaze by analyzing gaze direction and/or eyelid position and/or eyelid movement. Sensors in a steering wheel can detect a steering wheel grip force and/or a steering wheel grip pattern. Road lane detection sensor(s) such as a camera can detect if the vehicle 50 wobbles relatively a road lane.

When at least one of the predefined vehicle occupant conditions, as described above, is detected, the vehicle safety arrangement 1 is arranged to initiate a command to a vehicle drive system 52 to perform a controlled stop of the vehicle 50. Such a vehicle drive system 52 can include several co-operating subsystems which together are configured to stop the vehicle 50 in a controlled manner in response to the command. For example a vehicle camera, lidar and/or radar may be arranged to detect surrounding objects, traffic, road lanes et cetera. Hereby real time vehicle surrounding information can be provided to e.g., an automatic cruise control system or automatic brake system, such that such a system can be used to stop the vehicle 50 in a controlled manner.

Figure 2:
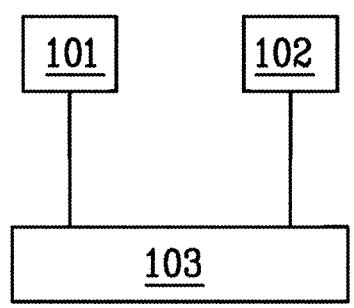
FIG. 2 illustrates a method for increasing safety in a vehicle.

FIG. 2 illustrates a method 100 for increasing safety in a vehicle 50 comprising a vehicle propellant amount determination unit 3, arranged to determine an amount of propellant stored in the vehicle 50, a vehicle passenger compartment 5, a vehicle motor 7, a communication unit 9 and a vehicle occupant detection unit 11, arranged to detect at least one of: presence of at least one vehicle occupant 13 and a vehicle occupant condition, characterized in that the method 100 comprises;

detecting 101 the presence of at least one vehicle occupant 13 within the vehicle passenger compartment 5 and detecting if the vehicle motor 7 has been inoperative for a threshold amount of time, or detecting 102 a vehicle occupant condition, which matches at least one predefined vehicle occupant condition, and if either is detected initiating 103 a communication indicative of the amount of propellant stored in the vehicle 50 to an external recipient 60.

As one skilled in the art would understand, any of the above mentioned arrangements and units (e.g, 1, 3, 9, 11, 17) may include suitable hardware and/or software, such as one or more processors (e.g., one or more microprocessors, microcontrollers and/or programmable digital signal processors) in communication with one or more storage devices or media including computer readable program instructions that are executable by the one or more processors so that the arrangement or unit may perform particular algorithms represented by the functions and/or operations described herein. Each of the arrangements and units (e.g, 1, 3, 9, 11, 17) may also, or instead, include one or more application specific integrated circuits, programmable gate arrays or programmable array logic, programmable logic devices, or digital signal processors.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A vehicle safety arrangement for a vehicle including a vehicle propellant amount determination unit configured to determine an amount of propellant stored in the vehicle, a vehicle passenger compartment, and a vehicle motor, the vehicle safety arrangement comprising:
   a communication unit; and
   a vehicle occupant detection unit configured to detect at least one of presence of at least one vehicle occupant and a vehicle occupant condition;
   wherein the vehicle safety arrangement is configured to initiate a communication indicative of the amount of propellant stored in the vehicle to an external recipient if
   the presence of at least one vehicle occupant is detected within the vehicle passenger compartment and the vehicle motor has been inoperative for a threshold amount of time, or
   a vehicle occupant condition is detected, which matches at least one predefined vehicle occupant condition.

2. The vehicle safety arrangement according to claim 1 wherein the vehicle safety arrangement is configured to initiate the communication indicative of the amount of propellant stored in the vehicle only if the amount is below a predefined threshold amount.

3. The vehicle safety arrangement according to claim 1 wherein the vehicle safety arrangement is configured to initiate the communication indicative of the amount of propellant stored in the vehicle if the presence of at least one vehicle occupant is detected within the vehicle passenger compartment when the vehicle motor has been inoperative for the threshold amount of time and temperature within the vehicle passenger compartment, provided by a vehicle temperature sensor, is above a predefined threshold temperature.

4. The vehicle safety arrangement according to claim 3 further comprising a vehicle occupant recognition arrangement that is configured to recognize different kinds of vehicle occupants, wherein the vehicle safety arrangement is configured to initiate the communication indicative of the amount of propellant stored in the vehicle if the presence of at least one vehicle occupant is detected within the vehicle passenger compartment, the at least one vehicle occupant being at least one of an infant, a child and an animal.

5. The vehicle safety arrangement according to claim 1 wherein the vehicle safety arrangement is connectable to a vehicle passenger compartment ventilating system and is further configured to initiate an activation command to the vehicle passenger compartment ventilating system if the presence of at least one vehicle occupant is detected within the vehicle passenger compartment and the vehicle motor has been inoperative for the threshold amount of time.

6. The vehicle safety arrangement according to claim 1 further comprising a ventilation system status determination unit, wherein the vehicle safety arrangement is configured to initiate the communication indicative of the amount of propellant stored in the vehicle only if the vehicle passenger compartment ventilating system status is inoperative.

7. The vehicle safety arrangement according to claim 1 wherein the vehicle safety arrangement is connectable to a vehicle door control system and is further configured to initiate an activation command to open a vehicle door to the vehicle door control system if the presence of at least one vehicle occupant is detected within the vehicle passenger compartment and the vehicle motor has been inoperative for a threshold amount of time.

8. The vehicle safety arrangement according to claim 1 wherein the vehicle propellant amount determination unit is configured to determine a fuel level within a vehicle fuel tank.

9. The vehicle safety arrangement according to claim 1 wherein the vehicle propellant amount determination unit is configured to determine a state of charge of a vehicle propellant storage unit.

10. The vehicle safety arrangement according to claim 1 wherein the vehicle safety arrangement is connectable to a vehicle velocity determination unit configured to determine a vehicle velocity, and wherein the communication unit is configured to initiate the communication to the external recipient indicative of the amount of propellant stored in the vehicle if it is determined that:
the vehicle is driven with a velocity exceeding a threshold velocity and
a vehicle occupant condition is detected, which matches at least one predefined vehicle occupant condition being at least one of:
i. drowsiness,
ii. a shifting gaze,
iii. decreased steering wheel grip,
iv. unsteady steering wheel handling,
v. an increased heart rate.

11. The vehicle safety arrangement according to claim 10 wherein the communication unit further is configured to, when at least one of the predefined vehicle occupant conditions is detected, initiate a command to perform a controlled stop of the vehicle to a vehicle drive system that is configured to stop the vehicle in a controlled manner in response to the command.

12. A vehicle comprising the vehicle safety arrangement according to claim 1.

13. A method for increasing safety in a vehicle including a vehicle propellant amount determination unit arranged to determine an amount of propellant stored in the vehicle, a vehicle passenger compartment, a vehicle motor, a communication unit and a vehicle occupant detection unit arranged to detect at least one of: presence of at least one vehicle occupant and a vehicle occupant condition, the method comprising:
initiating via the communication unit, a communication indicative of the amount of propellant stored in the vehicle to an external recipient if
presence of at least one vehicle occupant is detected within the vehicle passenger compartment by the vehicle occupant detection unit and the vehicle motor has been inoperative for a threshold amount of time, or
a vehicle occupant condition is detected, which matches at least one predefined vehicle occupant condition.

* * * * *